July 9, 1963  J. E. GORGENS ETAL  3,096,651
DIAL INSTRUMENT WITH EXTERNAL CALIBRATION
Filed March 20, 1961
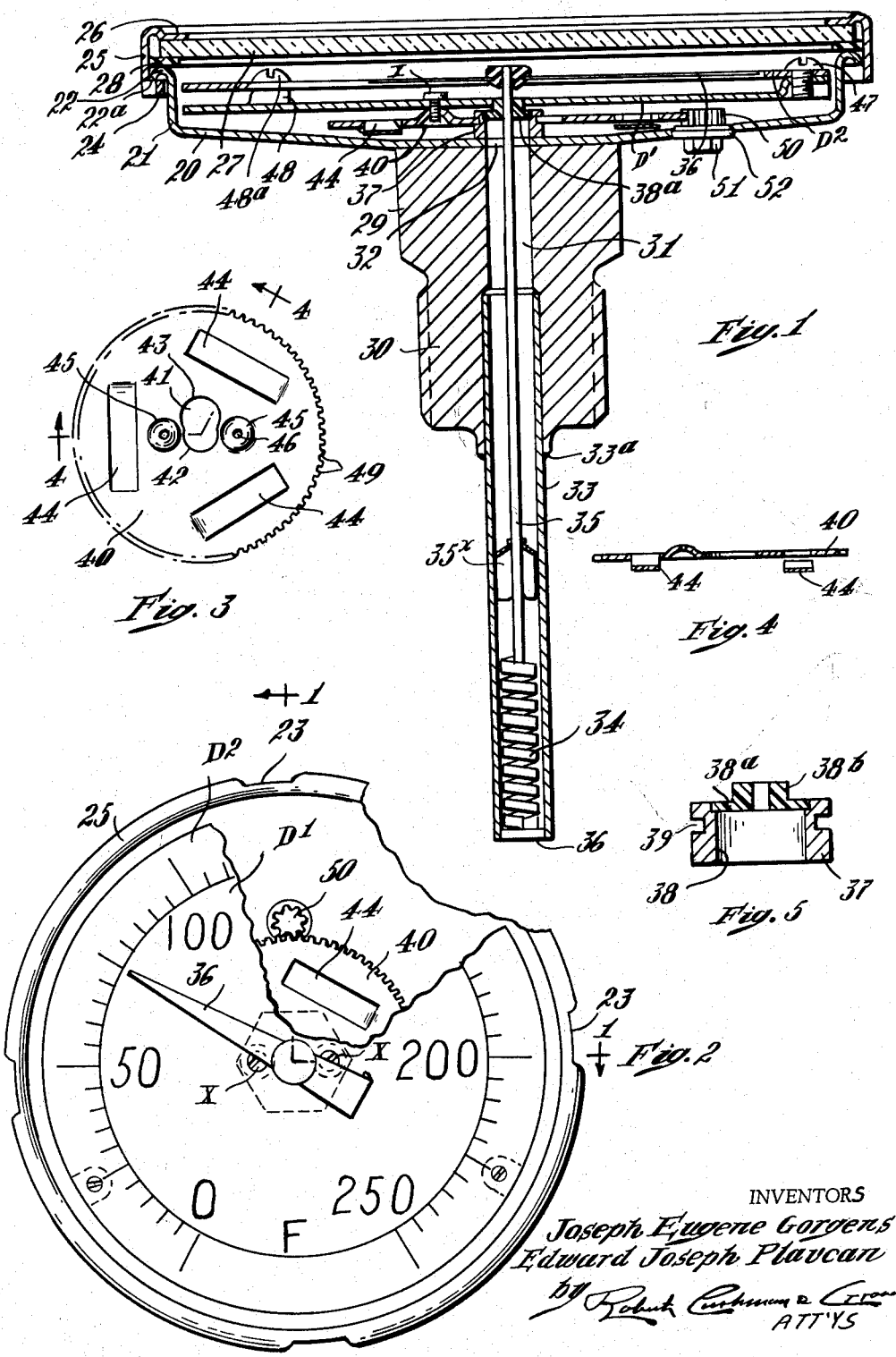
INVENTORS
Joseph Eugene Gorgens
Edward Joseph Plavcan
by Robert Cushman & Croon
ATT'YS

United States Patent Office 3,096,651
Patented July 9, 1963

3,096,651
DIAL INSTRUMENT WITH EXTERNAL CALIBRATION
Joseph E. Gorgens, Easton, and Edward J. Plavcan, Stratford, Conn., assignors to Manning, Maxwell & Moore, Incorporated, Stratford, Conn., a corporation of New Jersey
Filed Mar. 20, 1961, Ser. No. 96,870
11 Claims. (Cl. 73—363.9)

This invention pertains to dial instruments of the type in which a normally stationary graduated dial is housed within a casing and wherein a pointer or index, mounted on a rotary staff, perpendicular to the plane of the dial, is turned in response to variations in a physical characteristic, for instance variations in temperature or pressure, and relates more especially to means whereby the instrument may be recalibrated during use. Such instruments, for instance dial thermometers, are customarily adjusted or calibrated very carefully by the manufacturer, but because of slow changes in the material of which the instrument is made, or because of exposure to shock, or atmospheric conditions, such instruments may lose their initial accuracy and require adjustment or recalibration. Customarily, the case of such an instrument comprises a transparent panel through which the dial and pointer may be viewed. One common way of recalibrating the instrument is by turning the normally stationary dial relatively to the case. However, this can only be accomplished, in usual instruments of this kind, after having first removed the transparent panel and removing or loosening certain parts, for instance, the means by which the dial is normally held in place. The dial is then carefully turned by very small increments to restore the parts to their initial position of accurate adjustment. After this, the transparent panel and other parts must be restored to their normal operating condition. All of these manipulations are time consuming and, under certain circumstances of use, difficult of accomplishment.

The present invention has for its principal object the provision of means whereby, without removing the transparent panel from the case and without removing or loosening any of the parts housed within the casing, it is possible to recalibrate the instrument with all of the requisite accuracy and even though the instrument may be located in a place difficult of access. This object is accomplished, in accordance with the present invention, by mounting the dial upon a carrier, coaxial with the index staff, which is rotatable relatively to the instrument case, and turning this carrier by means of a gear and pinion, the latter being fixed to a shaft which extends to the exterior of the instrument case. Provision is made for retaining the carrier in adjusted position, although permitting it to be turned in response to the rotation of the pinion without necessitating the loosening or removal of parts. Accuracy of adjustment is provided for by the use of a gear which is of much larger diameter than the actuating pinion, so that even a full rotation of the pinion results in but a small angular motion of the dial.

A further object is to provide an instrument having provision for recalibration, from the exterior of the case, which is of simple construction, comprising a minimum number of parts and so devised that the parts may be assembled very readily and without the requirement for a high degree of skill. In the attainment of this latter object the carrier, upon which the dial is mounted, is a disc, for example, of sheet metal having gear teeth at its peripheral edge and having spring arms struck up from the metal of the disc which bear against the inner face of the instrument case, so as to oppose frictional resistance to rotation of the disc. In order to hold the disc in close adjacency to the surface of the case, so as to keep the spring tongues under tension, there is a fixed bearing stud, coaxial with the index staff, which has a peripheral groove of an axial width substantially equal to the thickness of the disc member, and the latter is provided with an elongate slot, one end of which is of circular curvature, coaxial with the toothed edge of the disc, to provide an edge which is normally seated in the groove in the fixed stud, the opposite end of the slot being of a size to admit the stud, making it possible to assemble the parts by entering the stud into said larger end of the slot and then sliding the disc until a circular portion of the slot in the disc is received in the groove in the stud while, at the same instant, the teeth of the gear engage the teeth of the pinion. In order to center the dial and thus to keep the teeth of the pinion and gear in mesh, the bearing stud carries a part which fits within the center hole of the dial so that the latter cannot shift.

Other and further objects and advantages of the invention will be pointed out in the following more detailed description and by reference to the accompanying drawings wherein:

FIG. 1 is a diametrical section illustrating a dial thermometer embodying the present invention;

FIG. 2 is a plan view, looking down at the dial of the instrument, with a portion of the dial removed to show the dial carrier and its actuating pinion;

FIG. 3 is a plan view of the dial carrier removed from the instrument case and showing the friction elements or spring tongues and the slot which receives the pivot stud upon which the carrier turns;

FIG. 4 is a section on the line 4—4 of FIG. 3; and

FIG. 5 is a diametrical section through the bearing stud on which the dial carrier turns.

Referring to the drawings, the numeral 20 designates the base portion of the instrument case, this base portion, as here illustrated, being a metal stamping and having the upwardly directed, peripheral wall 21, which terminates in a bead 22 having a down-turned edge 22a. This bead is provided at peripherally spaced points (FIG. 2) with notches 23 through which spaced lugs 24 at the lower edge of the peripheral wall 25 of a cap or bezel ring may be passed, after which the ring may be turned, a part turn, thereby to lock the ring to the case. The bezel ring has a horizontal flange 26 designed to bear upon the upper surface of a transparent panel 27, whose margin rests upon a resilient gasket 28, supported by the bead 22 at the upper edge of the housing wall 21.

The bottom wall 20 of the instrument case or housing is fixed to the upper surface of a hexagonal nut 29, for example, by silver solder or welding, this nut having an integral shank portion 30 which is externally screw-threaded, whereby the instrument may be mounted upon an appropriate support, for example, in a screw-threaded hole in the wall of a vessel within which variations in temperature take place. The combined nut 29 and shank 30 has an axial bore 31 and the bottom wall 20 of the instrument casing has a central opening 32 coaxial with the opening 31.

The shank 30 is counterbored for the reception of the upper end of the tube 33 which is fixed to the shank 30, for example, by welding at 33a. Within the lower end of the tube 33 there is housed a bimetallic coil 34 whose lower end is fixed to a cap 36 closing the lower end of the tube, and whose upper end is fixed to the index staff 35. The latter turns in a bearing 35x fixed in tube 35 and extends up through the bore 31 and through the hole 32 into the interior of the instrument case. The pointer 36 is fixed to the upper end of this staff 35 so as to turn with the latter.

A short tubular bearing stud 37 (FIGS. 1 and 5) is arranged within the lower part of the instrument case in coaxial relation with the pointer staff and with its lower end fixed to the lower wall 20 of the instrument case, for example, by silver solder or the like. This stud is provided with a central bore 38, enlarged at its upper end to provide a socket in which is fixed a bearing member 38a for the pointer staff, said bearing being of a material having a low coefficient of friction, for example of nylon, in which the staff 35 turns, the upper part of the bearing constituting a pintle on which the dial disc D' may turn. The stud 37 has a peripheral groove 39 which is here shown as rectangular in radial section, the inner wall of the groove being circular. This stud provides a bearing for a dial carrier 40. As here shown, this carrier is a disc of stiffly resilient sheet metal having, at its central portion, an elongate slot 41, one end 42 of which is a circular arc of radius such that its inner edge may have rotational contact with the inner wall of the groove 39 in the bearing stud 37. The opposite end portion of this elongate slot 41 is also of circular curvature, but of a diameter such that it may be fitted down freely over the stud 37 in assembling the parts.

As herein shown (FIG. 3), the disc 40 is provided with three spring tongues 44 integral with the disc and which are struck downwardly so as, in the assembled structure, resiliently to press against the bottom wall of the case, thereby developing an upward axial thrust against the disc 40 which is resisted by the upper wall of the groove 39 in the fixed bearing stud 37, the tongues thus forming friction brakes, operative to resist motion of the disc 40 about the stud 37 and to retain it in adjusted position.

The disc 40 is provided with two upwardly directed bosses 45 centered upon a diameter of the disc which passes through the center of curvature of the edge 42 of the slot and at equal distances from said center of curvature. Each of these bosses has a central, internally screw-threaded hole 46 for the reception of a screw X passing through a hole in the bottom plate D¹ of the dial, and by means of which said plate may be fixed to the carrier disc 40. The dial also comprises the flat annulus D², resting upon lugs 48 projecting up from bottom plate D¹ and secured by screws 48a, the inner edge of the annulus being in the plane of rotation of pointer 36. The plate D¹ is graduated and the annulus has designating characters. The peripheral edge of the dial carrier disc 40 is provided with gear teeth 49 which mesh with the teeth of a pinion 50 which is fixed to the upper end of a short shaft 51 which turns in a bearing 52 (FIG. 1) fixed in a hole in the lower wall 20 of the instrument case. The lower end of this shaft 51, which is at the outside of the case, is suitably shaped for the reception of a wrench or screw driver whereby the shaft may be turned, thus rotating the pinion and with it the dial. The groove 39 in the bearing stud 37 is at such a distance above the upper surface of the lower wall 20 of the instrument case, that in assembling the carrier disc 40 with the stud 37, the spring tongues are so resiliently bent that they press forcibly against the upper surface of the wall 20, thus opposing rotation of the pinion.

A rubber sealing washer is interposed between the pinion and the bearing 52, thereby to prevent leakage of fluid into the casing.

The bearing member 38a has an upwardly directed, coaxial dial-centering pintle portion 38b which fits snugly into the central hole in the dial member D¹ and thus prevents the dial from shifting laterally. Since the dial member D¹ is secured to the dial carrier 40 by the screws X, accidental separation of the teeth of the carrier and pinion 50 is prevented.

As here illustrated, the pitch diameter of the pinion is approximately one-eighth that of the gear defined by the teeth 49, at the edge of the disc 40, so that even a substantial motion of the pinion 50 results in but a slight arcuate motion of the disc 40.

In assembling the parts, and assuming that the bezel ring 25 and the transparent panel 27 have been removed from the bottom member 20 of the casing, and that the pointer 36 has not yet been applied to the staff 35, the dial carrier disc 40 is so placed relatively to the bearing stud 37, that the latter may pass through the large end 41 of the keyhole slot in the disc 40, until the inner edge of the disc is in the plane of the groove 39 in the stud. This groove is at such a distance above the upper surface of the bottom plate 20 of the case, that the plate must be pressed down, thus placing the tongues 44 under tension, in order that the edge of the disc may be brought into the plane of the groove 39. With the plate thus depressed, it is then moved diametrically toward the pinion 50 until the small end of the slot is coaxial with the stud 37 and until the edge 42 of the slot engages the inner edge of the groove 39. The parts are so dimensioned that, when the edge 42 contacts the inner wall of the groove 39, the teeth 49 upon the edge of the disc are in operative engagement with the teeth of the pinion 50.

It may be noted that the bottom wall 20 of the instrument case is slightly dished and this, because of the symmetrical arrangement of the spring tongues of the dial-carrying disc 40, aids in retaining the disc in properly assembled relation to the bearing stud upon which it turns.

The dial member D¹ is now placed on the dial carrier disc, with its central hole fitting over the part 38b and attached by screws, and then the annulus D² is mounted on lugs 48 and secured by screws 48a. The pointer 36 may now be mounted on the staff and the bezel ring with the transparent panel 27 assembled and locked to the wall 21 of the instrument case.

With the parts thus assembled, it is readily possible to calibrate the instrument, either initially, or during use, merely by turning the shaft 51, to which the pinion 50 is secured. During such rotation of the pinion, the disc 40 is turned about the stud 37 as an axis, the motion of the disc being opposed by the friction tongues 44 bearing on the upper surface of the floor 20 of the instrument case. The rubber washer beneath the pinion 50 also acts frictionally to retard motion of the pinion. Thus, when the carrier disc has been adjusted, it is retained in adjusted position, together with the dial, until the stud 51 is again purposely rotated for a recalibration of the instrument.

The arrangement, as herein disclosed, provides a dial carrier independent of the dial, upon which any ordinary dial may be mounted, thus making it possible to provide the instrument with a standard dial graduated for a selected particular use, so avoiding the necessity for providing the dial itself with gear teeth, as has previously been suggested. Moreover, by the simple expedient of providing the dial carrier with the spring tongues which, in use, exert substantial frictional pressure against the instrument case, the dial is held in adjusted position without recourse to screws, or bolts, which must be loosened or removed prior to and restored after adjustment. Furthermore, by the use of this simple disc-type dial carrier with its central keyhold slot and by the use of the fixed bearing stud with its peripheral groove, it becomes possible to assemble the parts in the simplest possible way and to reduce the number of parts requisite to accomplish the desired result to a minimum, thus not only reducing cost incident to assembly, but also the cost of making the necessary parts for the attainment of the desired result.

While one desirable embodiment of the invention has herein been illustrated and described, it is to be understood that the invention is broadly inclusive of any and all modifications falling within the scope of the appended claims.

We claim:

1. In a dial instrument of the kind wherein a case houses a normally stationary, graduated dial and wherein a pointer is mounted upon a staff extending perpendicular and coaxial with the dial; a rotary dial carrier independent of the dial and arranged within the case, means removably securing the dial to the carrier, means operative to turn the carrier thereby to adjust its graduations relative to the pointer, said carrier being a disc of stiffly resilient material, and means normally operative to hold the carrier in adjusted position while permitting the carrier to be turned in response to the application of sufficient force including a plurality of integral tongues struck down from the plane of the disc with the free ends of said tongues contacting an interior surface of the case, and means whereby said tongues are held under bending stress so that they exert frictional force against said surface.

2. A dial instrument according to claim 1, wherein a bearing stud, coaxial with the pointer staff, is fixed to the wall of the instrument case, said stud having a peripheral groove and the carrier disc having a centrally located keyhole slot whose larger end is of a diameter at least as great as the outside diameter of said bearing stud, and whose smaller end has an edge of circular curvature and of a radius substantially equal to that of the inner wall of said groove in the stud, the groove being at such a distance above the interior surface of the instrument case that, when the inner edge of the carrier disc is disposed in the groove in the stud, the tongues are so stressed as frictionally to press against the inner surface of the case.

3. A dial instrument according to claim 1, wherein the dial carrier has gear teeth on its peripheral edge, and a pinion, whose teeth mesh with the gear teeth on the disc, is mounted upon a rotatable shaft which extends from the exterior to the interior of the instrument case and which may be turned by the application of force to its outer end, a bearing stud upon which the disc turns, the bearing stud and the disc being so shaped, that, in assembling them, the spring tongues are placed under bending stress so that their free ends bear frictionally against said interior surface of the case, and a bearing for the pointer staff fixed in a socket in the upper end of the bearing stud, said bearing comprising a part constituting a pintle which fits within a central hole in the dial, thereby centering the dial and keeping the teeth of the dial carrier and pinion always in mesh.

4. A dial instrument according to claim 3, wherein the bearing stud has a peripheral groove and the disc has a centrally located aperture comprising an edge of circular curvature which fits within the groove in the stud when the parts are assembled, so that the stud forms a bearing about whose axis the disc may turn, the groove in the stud being at such a distance from the adjacent surface of the case that, in assembling the parts, the spring fingers must be compressed in order that the edge of the aperture in the disc may be installed in the groove.

5. A dial instrument according to claim 4, further characterized in that the aperture at the central portion of the carrier disc is of keyhole shape and of a size, at its larger end, such that the disc may be slipped axially down over the stud, the edge of circular curvature being at the smaller end of the opening, and the slot being of such length that, after slipping the disc down over the stud, the disc may be moved longitudinally of said slot until its circular edge is disposed in bearing engagement with the inner wall of the groove in the stud, and with the teeth of the disc meshing with those of the pinion, and means operative to prevent accidental separation of said teeth after assembly.

6. In a dial instrument of the kind wherein a case houses a normally stationary, graduated dial and wherein a pointer is mounted upon a staff perpendicular to and coaxial with the dial; a disc of stiffly resilent material having a plurality of symmetrically arranged spring members projecting from its lower surface, said dial carrier being independent of the dial and arranged within the case, means removably securing the dial to the carrier, a fixed bearing stud coaxial with the pointer staff and constituting a bearing on which the carrier turns, and means operative to turn the carrier thereby to adjust the graduations of the dial relative to the pointer, the carrier and the bearing stud being so arranged that when the carrier is assembled with the stud, the spring members are held under bending stress in frictional contact with an interior surface of the case, thereby normally to hold the carrier in adjusted position while permitting the carrier to be turned in response to the application of sufficient force thereon.

7. A dial instrument of the kind wherein a case houses a normally stationary dial having a central circular aperture, a dial carrier independent of the dial, and means securing the dial to the dial carrier, a bearing stud fixed relatively to the case, said stud having a peripheral groove and the carrier having a centrally located keyhole slot whose larger end is of a diameter at least as great as the outside diameter of the bearing stud and whose smaller end has an edge of circular curvature and of a radius substantially equal to that of the inner wall of the groove in the stud, the slot being of such length that, in assembling the parts and after having first introduced the stud into the larger end of the slot, the carrier may be moved relatively to the stud longitudinally of the slot until the curved edge at the smaller end of the slot is disposed in bearing engagement with the inner wall of the peripheral groove in the stud, and means operative to retain the carrier and the stud in thus assembled relation.

8. A dial instrument according to claim 7, wherein the means for retaining the carrier and bearing stud in assembled relation comprises a pintle member fixed relatively to the stud and which fits within the central aperture in the dial.

9. A dial instrument according to claim 7, wherein the dial carrier is rotatable on said bearing stud, means frictionally resisting rotation of the carrier comprising a part which exerts force in an axial direction relative to the carrier and dial, the engagement between said carrier and peripheral groove on the bearing stud sustaining the axial thrust resulting from said force and wherein said means, operative to maintain the carrier and stud in assembled relation, comprises a fixed member of synthetic material carried by said bearing stud and received within said central aperture in the dial.

10. A dial instrument of the kind wherein a case houses a normally stationary graduated dial, a rotary dial carrier independent of the dial arranged within the case, the carrier having a plurality of resilient tongues extending down from its underside and whose free ends contact an interior surface of the case, and means whereby said tongues are held under bending stress so that they constantly exert frictional force against said surface thereby normally to prevent rotation of the carrier but permitting the carrier to be turned in response to the application of sufficient force.

11. A dial instrument of the kind wherein a case houses a normally stationary, graduated dial and wherein a pointer is mounted upon a staff perpendicular to and coaxial with the dial, a rotary dial carrier independent of the dial, arranged within the case, means for removably securing the dial to the carrier, means operative to turn the carrier thereby to adjust the graduations of the dial relatively to the pointer, means normally operative to hold the carrier in adjusted position, but which permits the carrier to be turned in response to the application of sufficient force, dial carrier being a stiff sheet metal disc having a centrally located aperture through which the pointer staff passes and having upwardly projecting bosses at opposite sides, respectively, of said aperture, each of said bosses having a centrally located screw-threaded hole, the bosses constituting supports for the dial, screws passing through apertures in the dial and into the screw-threaded holes in the respective bosses, thereby removably to secure the dial to the carrier.

References Cited in the file of this patent

UNITED STATES PATENTS 2,248,878    Kollsman _____ July 8, 1941

FOREIGN PATENTS 234,148    Switzerland _____ Jan. 3, 1945